(12) United States Patent
Sekiguchi

(10) Patent No.: US 6,961,176 B2
(45) Date of Patent: Nov. 1, 2005

(54) FRESNEL LENS SHEET, REAR PROJECTION SCREEN AND REAR PROJECTION DISPLAY

(75) Inventor: Hiroshi Sekiguchi, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 166 days.

(21) Appl. No.: 10/689,844

(22) Filed: Oct. 22, 2003

(65) Prior Publication Data

US 2004/0165261 A1 Aug. 26, 2004

(30) Foreign Application Priority Data

Oct. 31, 2002 (JP) .................... 2002-318930
Feb. 7, 2003 (JP) .................... 2003-030239

(51) Int. Cl.[7] .................. G03B 21/60; G03B 21/56; G02B 3/08
(52) U.S. Cl. .................. 359/457; 359/742; 359/460; 359/453
(58) Field of Search .................. 359/457, 742, 359/443, 460, 452, 453

(56) References Cited

U.S. PATENT DOCUMENTS 5,200,854 A * 4/1993 Ogino et al. ............ 359/451
6,088,158 A * 7/2000 Kimura ................... 359/443
6,348,993 B1 * 2/2002 Hori ....................... 359/443

FOREIGN PATENT DOCUMENTS

JP 61-208041 9/1986

* cited by examiner

Primary Examiner—Judy Nguyen
Assistant Examiner—Magda Cruz
(74) Attorney, Agent, or Firm—Oliff & Berridge, PLC

(57) ABSTRACT

A Fresnel lens sheet has an entrance surface provided with a plurality of total-reflection Fresnel lens elements. Each of the total-reflection Fresnel lens elements has a light-receiving facet and a total-reflection facet that deflects part of or all the image light fallen on the light-receiving facet in a desired direction. The Fresnel lens sheet meets a requisite condition expressed by an expression: $A_1 \leq 0.6 T_1/L_1$, where $L_1$ (mm) is the horizontal length of the Fresnel lens sheet, $T_1$ (mm) is the thickness of the Fresnel lens sheet, and $A_1$ (%) is maximum elongation percentage of the Fresnel lens sheet at which the Fresnel lens sheet lengthens due to moisture absorption. The Fresnel lens sheet includes a Fresnel lens element sheet, and an auxiliary sheet attached to the exit side of the Fresnel lens element sheet. The Fresnel lens element sheet enables efficient molding-removing work for removing the Fresnel lens element sheet from a mold.

16 Claims, 9 Drawing Sheets

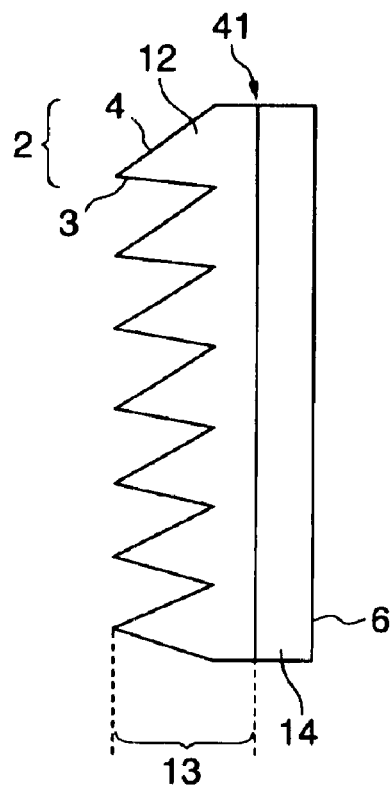
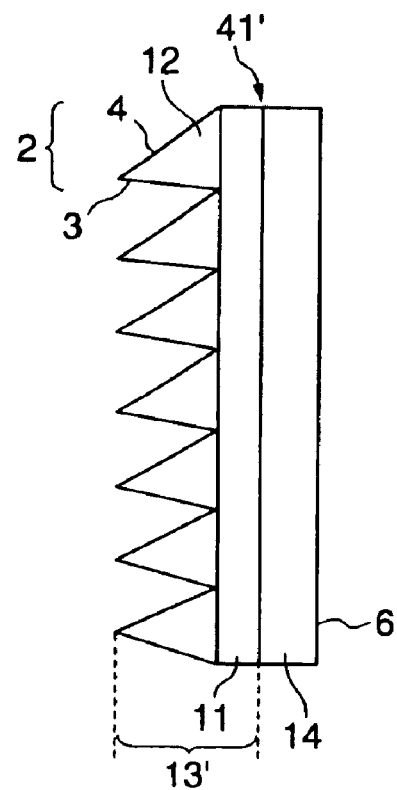
FIG. 13A    FIG. 13B
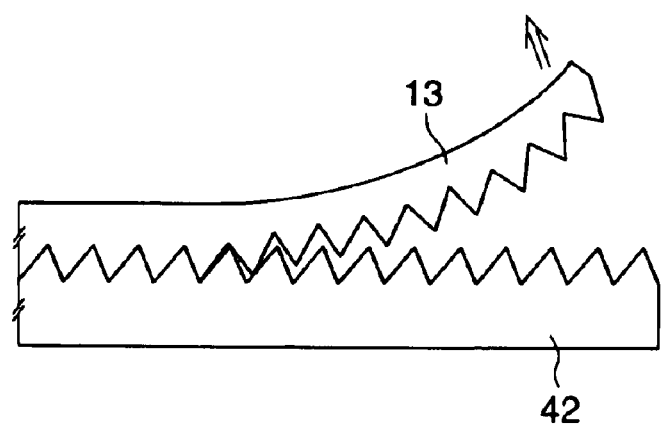
FIG. 14

FRESNEL LENS SHEET, REAR PROJECTION SCREEN AND REAR PROJECTION DISPLAY

TECHNICAL FIELD

The present invention relates to a Fresnel lens sheet that scarcely distorts a projected image in an environment subject to humidity variation, a rear projection screen and a rear projection display.

RELATED ART

A projection television display, i.e., a rear projection display, is provided with a rear projection screen on which an enlarged image is formed by video light emitted from a light source. Generally, the rear projection screen comprises a Fresnel lens element for diffracting diverging image light rays projected by a light source and fallen thereon such that parallel or substantially parallel light rays travel toward observers, and a lenticular lens element for dispersing the parallel or substantially parallel light rays such that the light rays travel toward observers distributed in a wide range. Usually, a three-tube CRT light source including three tubes respectively for emitting light rays of three primary colors is used as a light source for such a rear projection display. Recently, a single-tube light source using LCD or DLP has been employed.

Referring to FIG. 16, a rear projection display 52 provided with a single-tube light source 8 and a conventional mirror 53 projects image light rays 5 toward the mirror 53 so that the light rays 5 reflected toward the center of a rear projection screen 10 may fall on the center of the rear projection screen 10 perpendicularly or substantially perpendicularly to the rear projection screen 10. Therefore, the movement of the rear projection screen 10 toward or away from the light source 8 does not affect the projected image.

There has been proposed a rear projection display that projects image light rays obliquely on the center of a rear projection screen with an intention to construct the rear projection display in a small thickness. A Fresnel lens sheet provided with a total reflection Fresnel lens is proposed for use in such a rear projection display (JP-A 61-208041).

In the thin rear projection display provided with a Fresnel lens sheet in which an image light ray falls on the center of a rear projection screen obliquely to the surface of the rear projection screen, the Fresnel lens is displaced in a direction of the thickness of the Fresnel lens sheet. Therefore, the position of the Fresnel lens will move toward or away from the light source in case the Fresnel lens sheet warps due to elongation resulting from, for example, moisture absorption, and the rear projection screen swells or blisters.

Consequently, the position of a part of a displayed image corresponding to a central area of the Fresnel lens sheet changes with respect to height. Since the Fresnel lens sheet is framed, the position of a peripheral area of the Fresnel sheet does not change greatly and hence the position of the image in the peripheral area of the Fresnel lens sheet with respect to height scarcely changes. Accordingly, the Fresnel lens warps and the position of a central part of the Fresnel lens changes in the direction of the thickness of the Fresnel lens sheet if the Fresnel lens sheet lengthens, for example, due to moisture absorption. However, the position of the peripheral part of the Fresnel lens does not change greatly and, consequently, an image displayed on the rear projection screen is distorted. For example, a horizontal straight line displayed on the rear projection screen curves with respect to a horizontal direction.

There is a tendency that the incident angle of image light in the central area of a Fresnel lens sheet provided with a total-reflection Fresnel lens increases with a growing request for further thickness reduction in the rear projection display. Therefore, it is expected that serious problems will arise from the distortion of an image displayed on the rear projection screen. However, no measures have been taken at all to cope with such problems.

The Fresnel lens sheet provided with the total reflection Fresnel lens is formed by spreading a molding resin over a flat mold for molding the Fresnel lens sheet, curing the molding resin spread on the mold, and removing the cured Fresnel lens sheet from the mold. In forming a thick total reflection Fresnel lens sheet by such a Fresnel lens sheet forming process, the Fresnel lens sheet has low flexibility, and it is very difficult to remove the molded Fresnel lens sheet from the mold because the Fresnel lens elements are engaged in grooves formed in the mold.

Accordingly, there has been a demand for a Fresnel lens sheet that does not cause a significant distortion of an image displayed thereon even if the Fresnel lens sheet is used in an environment subject to humidity variation, and for a Fresnel lens sheet capable of being easily removed from a mold to improve the efficiency of removing lenses from molds.

DISCLOSURE OF THE INVENTION

The present invention has been made to solve the foregoing problems and it is therefore a first object of the present invention to provide a Fresnel lens sheet that scarcely distorts an image displayed thereon even in an environment subject to humidity variation, a rear projection screen and a rear projection display. A second object of the present invention is to provide a Fresnel lens sheet having, in addition to the foregoing effect, an effect of improving the efficiency of molded lens removal work for removing the Fresnel lens sheet from a mold in manufacturing the Fresnel lens sheet, a rear projection screen and a rear projection display.

The inventors of the present invention studied the foregoing problems and found a practically acceptable degree of deflection of the Fresnel lens sheet, and the relation between the thickness and physical properties of the Fresnel lens sheet required limiting the deflection of the Fresnel lens sheet to the practically acceptable degree, and have made the present invention on the basis of findings obtained by the studies.

According to the present invention, a Fresnel lens sheet has an entrance surface and an exit surface, the entrance surface being provided with a plurality of total reflection Fresnel lens elements, wherein each of the total reflection Fresnel lens elements has an entrance facet on which image light falls, and a total-reflection facet that totally reflects the image light fallen on the entrance facet toward the exit surface, and the horizontal length $L_1$ (mm) of the Fresnel lens sheet, thickness $T_1$ (mm) of the Fresnel lens sheet and maximum elongation percentage $A_1$ (%) of the Fresnel lens sheet at which the Fresnel lens sheet lengthens due to moisture absorption of the Fresnel lens sheet, meet a requisite condition expressed by a relational expression: $A_1 \leq 0.6 T_1 / L_1$.

According to the present invention, a Fresnel lens sheet comprises: a Fresnel lens having an entrance surface provided with a plurality of total reflection Fresnel lens elements, and a base sheet having an exit surface; wherein each of the total reflection Fresnel lens elements has an entrance facet on which image light falls, and a total-reflection facet that totally reflects the image light fallen on the entrance facet toward the exit surface, and the horizontal length $L_2$ (mm) of the base sheet, thickness $T_2$ (mm) of the base sheet and maximum elongation percentage $A_2$ (%) of the base sheet at which the base sheet lengthens due to moisture absorption of the base sheet, meet a requisite condition expressed by a relational expression: $A_2 \leq 0.6T_2/L_2$.

According to the Fresnel lens sheet of the present invention meeting the foregoing requisite condition, distortion of an image projected thereon scarcely occurs in an environment subject to humidity variation. The thickness of the Fresnel lens sheet can be determined for a material forming the Fresnel lens sheet or a material for forming the Fresnel lens sheet can be selectively determined after determining the thickness of the Fresnel lens sheet so that the Fresnel lens sheet may meet the foregoing requisite condition. Thus, considerable reduction of design cost and manufacturing cost can be expected.

According to the present invention, the Fresnel lens sheet has a Fresnel lens element sheet provided with the total reflection Fresnel lens elements, and an auxiliary sheet attached to the exit side of the Fresnel lens element sheet.

Since the Fresnel lens sheet meeting the foregoing requisite condition has the Fresnel lens element sheet and the auxiliary sheet, the Fresnel lens element sheet can be formed in a small thickness. Thus, the thin, flexible Fresnel lens element sheet can be easily removed from a mold for molding the Fresnel lens element sheet and hence the efficiency of a Fresnel lens sheet manufacturing process can be improved. Since the Fresnel lens sheet meets the foregoing requisite condition, an image projected on the Fresnel lens sheet is scarcely distorted in an environment subject to humidity variation, and the Fresnel lens sheet can improve the efficiency of molding removing work.

In the Fresnel lens sheet according to the present invention, the auxiliary sheet is a lenticular lens sheet provided with a lenticular lens.

According to the present invention, the Fresnel lens sheet formed by uniting the Fresnel lens element sheet and the lenticular lens sheet can be very efficiently manufactured.

In the Fresnel lens sheet according to the present invention, the Fresnel lens element sheet and the auxiliary sheet are formed of the same material Since the Fresnel lens element sheet and the auxiliary sheet of the Fresnel lens sheet according to the present invention are formed of the same material, an image projected on the Fresnel lens sheet is scarcely distorted even in an environment subject to humidity variation, and the deterioration of the flatness of the Fresnel lens sheet can be limited to the least unavoidable extent.

The Fresnel lens sheet according to the present invention contains a light-diffusing material that diffuses light.

According to the present invention, the Fresnel lens sheet is colored to absorb light.

According to the present invention, the Fresnel lens sheet has a light-absorbing part.

According to the present invention, stray light liable to appear in a Fresnel lens sheet provided with a total reflection Fresnel lens can be diffused or absorbed. Therefore, problems relating to a double image formed by stray light can be solved. As a consequence, the distortion of an image projected on the Fresnel lens sheet in an environment subject to humidity variation can be suppressed, and the formation of a double image can be prevented.

In the Fresnel lens sheet according to the present invention, both the entrance surface and the exit surface of the Fresnel lens sheet or either the entrance surface or the exit surface of the Fresnel lens sheet is coated with an antireflection layer.

According to the present invention, the reduction of contrast in an image due to reflected light can be suppressed.

According to the present invention, a rear projection screen comprises: a Fresnel lens sheet having an entrance surface and an exit surface, the entrance surface being provided with a plurality of total reflection Fresnel lens elements, and an exit surface; and a lenticular lens formed on the exit surface of the Fresnel lens sheet; wherein each of the total reflection Fresnel lens elements has a light-receiving facet on which image light falls, and a total-reflection facet that totally reflects the image light fallen on the light-receiving facet toward the exit surface, and the horizontal length $L_1$ (mm) of the Fresnel lens sheet, thickness $T_1$ (mm) of the Fresnel lens sheet and maximum elongation percentage $A_1$ (%) of the Fresnel lens sheet at which the Fresnel lens sheet lengthens due to moisture absorption of the Fresnel lens sheet meet a requisite condition expressed by a relational expression: $A_1 \leq 0.6T_1/L_1$.

According to the present invention, a rear projection screen comprises a Fresnel lens sheet comprising: a Fresnel lens having an entrance surface provided with a plurality of total reflection Fresnel lens elements, and a base sheet having an exit surface; and a lenticular lens formed on the exit surface of the Fresnel lens sheet; wherein each of the total reflection Fresnel lens elements has a light-receiving facet on which image light falls, and a total-reflection facet that totally reflects the image light fallen on the light-receiving facet toward the exit surface, and the horizontal length $L_2$ (mm) of the base sheet, thickness $T_2$ (mm) of the base sheet and maximum elongation percentage $A_2$ (%) of the base sheet at which the base sheet lengthens due to moisture absorption of the base sheet meet a requisite condition expressed by a relational expression: $A_2 \leq 0.6T_2/L_2$.

The present invention provides a rear projection screen formed by uniting Fresnel lens elements and lenticular lens elements.

In the rear projection screen according to the present invention, both the entrance surface and the exit surface or either the entrance surface or the exit surface is coated with an antireflection layer.

The present invention suppresses the reduction of contrast in an image due to reflected light.

According to the present invention, a rear projection display comprises rear projection screen comprising a Fresnel lens sheet having an entrance surface and an exit surface, the entrance surface being provided with a plurality of total reflection Fresnel lens elements, wherein each of the total reflection Fresnel lens elements has a light-receiving facet on which image light falls, and a total-reflection facet that totally reflects the image light fallen on the light-receiving facet toward the exit surface, and the horizontal length $L_1$ (mm) of the Fresnel lens sheet, thickness $T_1$ (mm) of the Fresnel lens sheet and maximum elongation percentage $A_1$ (%) of the Fresnel lens sheet at which the Fresnel lens sheet lengthens due to moisture absorption of the Fresnel lens sheet, meet a requisite condition expressed by a relational expression: $A_1 \leq 0.6T_1/L_1$.

According to the present invention, a rear projection display comprises a rear projection screen comprising a Fresnel lens sheet comprising a Fresnel lens having an entrance surface provided with a plurality of total reflection Fresnel lens elements, and a base sheet having an exit surface; wherein each of the total reflection Fresnel lens elements has a light-receiving facet on which image light falls, and a total-reflection facet that totally reflects the image light fallen on the light-receiving facet toward the exit surface, and horizontal length $L_2$ (mm) of the base sheet, thickness $T_2$ (mm) of the base sheet and maximum elongation percentage $A_2$ (%) of the base sheet at which the base sheet lengthens due to moisture absorption of the base sheet, meet a requisite condition expressed by a relational expression: $A_2 \leq 0.6 T_2/L_2$.

According to the present invention, a rear projection display comprises a rear projection screen comprising a Fresnel lens sheet having an entrance surface and an exit surface, the entrance surface being provided with a plurality of total reflection Fresnel lens elements, and a lenticular lens formed on the exit surface of the Fresnel lens sheet; wherein each of the total reflection Fresnel lens element has a light-receiving facet on which image light falls, and a total-reflection facet that totally reflects the image light fallen on the light-receiving facet toward the exit surface, and the horizontal length $L_1$ (mm) of the Fresnel lens sheet, thickness $T_1$ (mm) of the Fresnel lens sheet and maximum elongation percentage $A_1$ (%) of the Fresnel lens sheet at which the Fresnel lens sheet lengthens due to moisture absorption of the Fresnel lens sheet, meet a requisite condition expressed by a relational expression: $A_1 \leq 0.6 T_1/L_1$.

According to the present invention, a rear projection display comprises a rear projection screen comprising a Fresnel lens having an entrance surface provided with a plurality of total reflection Fresnel lens elements and, a base sheet having an exit surface, and a lenticular lens formed on the exit surface of the Fresnel lens; wherein each of the total reflection Fresnel lens elements has a light-receiving facet on which image light falls, and a total-reflection facet that totally reflects the image light fallen on the light-receiving facet toward the exit surface, and the horizontal length $L_2$ (mm) of the base sheet, thickness $T_2$ (mm) of the base sheet, and maximum elongation percentage $A_2$ of the base sheet (%) at which the base sheet lengthens due to moisture absorption of the base sheet, meet a requisite condition expressed by a relational expression: $A_2 \leq 0.6 T_2/L_2$.

BRIEF DESCRIPTION OF THE DRAWINGS

FIG. 13A is a sectional view of a Fresnel lens sheet in a preferred embodiment according to the present invention;

FIG. 13B is a sectional view of a Fresnel lens sheet in a preferred embodiment according to the present invention;

FIG. 14 is a view of assistance in explaining a molding removing process of removing a molded Fresnel lens sheet from a mold;

DESCRIPTION OF THE PREFERRED EMBODIMENTS

Fresnel lens sheets, rear projection screens and rear projection displays in preferred embodiments according to the present invention will be described.

Fresnel Lens Sheet

Figure 1:
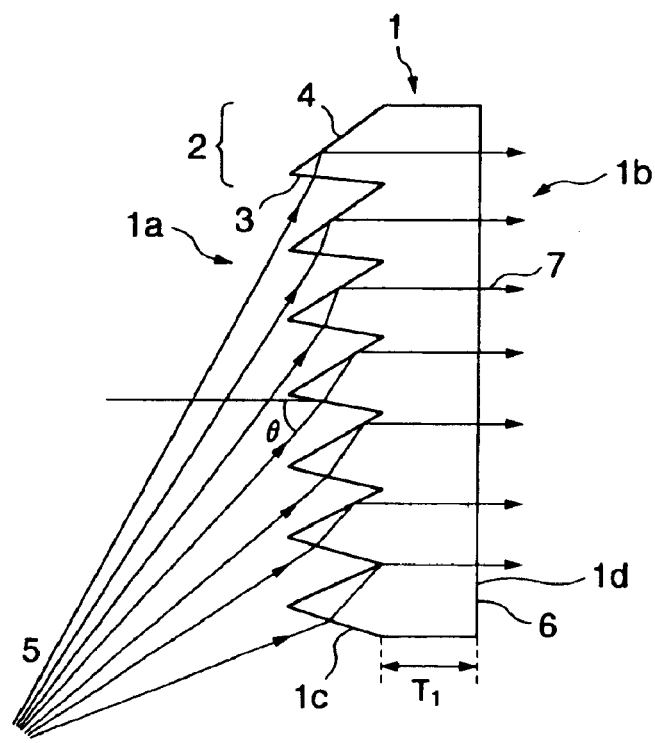
FIG. 1 is a sectional view of a unitary Fresnel lens sheet provided with a total reflection Fresnel lens.

As shown in FIG. 1, a Fresnel lens sheet 1 according to the present invention has an entrance surface 1a provided with a plurality of total reflection Fresnel lens elements 2, and an exit surface 1b. Each of the Fresnel lens elements 2 has a light-receiving facet 3, and a total reflection facet 4 that deflects some or all of image light rays fallen on the light-receiving facet 3 in a desired direction. More concretely, the Fresnel lens sheet 1 is a unitary Fresnel lens sheet provided with the total reflection Fresnel lens elements 2 as shown in FIG. 1. A Fresnel lens sheet 1' according to the present invention may be a composite Fresnel lens sheet consisting of a base sheet 11, and a Fresnel lens 12 consisting of Fresnel lens elements 2 formed on the base sheet 11.

It is a feature of the present invention that the Fresnel lens sheets 1 and 1' meet a requisite condition expressed by a relational expression: $A \leq 0.6 T/L$, where L ($L_1$ or $L_2$) (mm) is the horizontal length, T ($T_1$ or $T_2$) (mm) is the thickness, and A ($A_1$ or $A_2$) (%) is the maximum elongation percentage due to moisture absorption of the Fresnel lens sheet 1 or 1'. In the following description, $L_1$, $T_1$ and $A_1$ are used as parameters defining the characteristic of the Fresnel lens sheet 1 shown in FIG. 1, and $L_2$, $T_2$ and $A_2$ are used as parameters defining the characteristic of the base sheet 11 of the Fresnel lens sheet 1' shown in FIG. 2 when necessary.

The Fresnel lens sheet of the present invention meeting the requisite condition expressed by a relational expression: $A \leq 0.6 T/L$ does not warp to an extent that will distort an image formed by image light rays 7 passed through the Fresnel lens sheet even if the humidity of the environment around the Fresnel lens sheet changes. Therefore, even if an incident light ray 5 that fall on a central part of the Fresnel lens sheet fall on the Fresnel lens sheet at a large incident angle θ, the image formed by the image light rays 7 passed through the Fresnel lens sheet is not distorted remarkably. Thus, the Fresnel lens sheet of the present invention is effective in forming a rear projection display having a small thickness and in improving picture quality. If A>0.6T/L, it is possible that the Fresnel lens sheet is warped by change in the humidity of the environment to an extent that will distort the image formed by the image light rays 7 passed through the Fresnel lens sheet and, as a consequence, the image formed by the image light rays 7 may be markedly distorted.

The requisite condition expressed by A≦0.6T/L will be explained.

Generally, the size represented by the length of the diagonal of a screen included in a rear projection display is on the order of 50 in. (aspect ratio: 4:3, 762 by 1061 mm) or greater. Therefore, even if an image displayed on such a large screen is distorted, the viewer is not necessarily able to perceive the distortion of the image. The inventors of the present invention examined various images for distortion and found that an allowable limit of distortion is on the order of 3/1000 of unit length. For example, when an image 9 of an L mm long horizontal straight line displayed on a screen is distorted by a deflection P, it is very difficult for the viewer to perceive the distortion of the image 9 of the straight line if the deflection P is not greater than 3L/1000.

Figure 6:
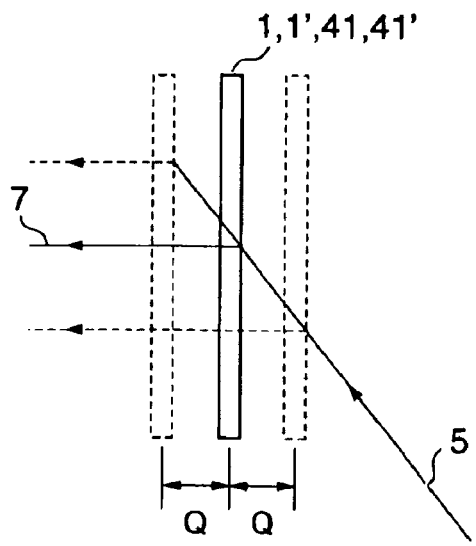
FIG. 6 is a diagrammatic view of assistance in explaining the displacement of an image according to the displacement of a Fresnel lens in a thin rear projection display.

In the recent rear projection display in which the image light rays 5 fall on the Fresnel lens sheet obliquely, the image light ray 5 falls on the center of the Fresnel lens sheet at an incident angle θ in the range of 60° to 65°. The inventors of the present invention found that the allowable displacement Q of the Fresnel lens sheet in the direction of the thickness of the Fresnel lens sheet must not be greater than 3L/2000 to suppress the distortion of the image such that the deflection P of the image 9 of the straight line is within 3L/1000 (FIG. 6).

The inventors of the present invention thought that the displacement of the Fresnel lens sheet in the direction of the thickness of the Fresnel lens sheet is caused by change in the humidity of an environment in which the rear projection display is installed, and studied the elongation percentage of a plastic Fresnel lens sheet at which the plastic Fresnel lens sheet lengthens due to moisture absorption, more concretely, the difference in elongation percentage between the front and the back surface of a plastic Fresnel lens sheet.

Generally, a Fresnel lens sheet included in a rear projection screen for a rear projection display is the nearest to a light source, and the entrance surface provided with a Fresnel lens is exposed to the atmosphere. A lenticular lens sheet or a front sheet is attached to the exit surface 6 of the Fresnel lens sheet facing the viewer, and hence the exit surface is not exposed directly to the atmosphere. Therefore, if the humidity of the atmosphere changes, the respective lengths of the entrance surface and the exit surface change differently due to the difference between the entrance surface and the light-emitting surface in moisture absorption. The elongation percentage of the entrance surface exposed to the atmosphere is greater than that of the exit surface not exposed directly to the atmosphere. However, since moisture absorbed through the entrance surface by the Fresnel lens sheet disperses in the Fresnel lens sheet, the difference in elongation percentage between the entrance surface and the exit surface is not directly proportional to the difference in moisture absorption between the entrance surface and the exit surface. The inventors of the present invention studied such a fact and found that the difference in elongation percentage between the entrance surface and the exit surface of a Fresnel lens sheet formed from a plastic sheet having a thickness in the range of, for example, about 1 to about 10 mm is on the order of 10% of an elongation percentage at a maximum moisture absorption, i.e., a moisture absorption at a humidity of 100%.

Figure 4:
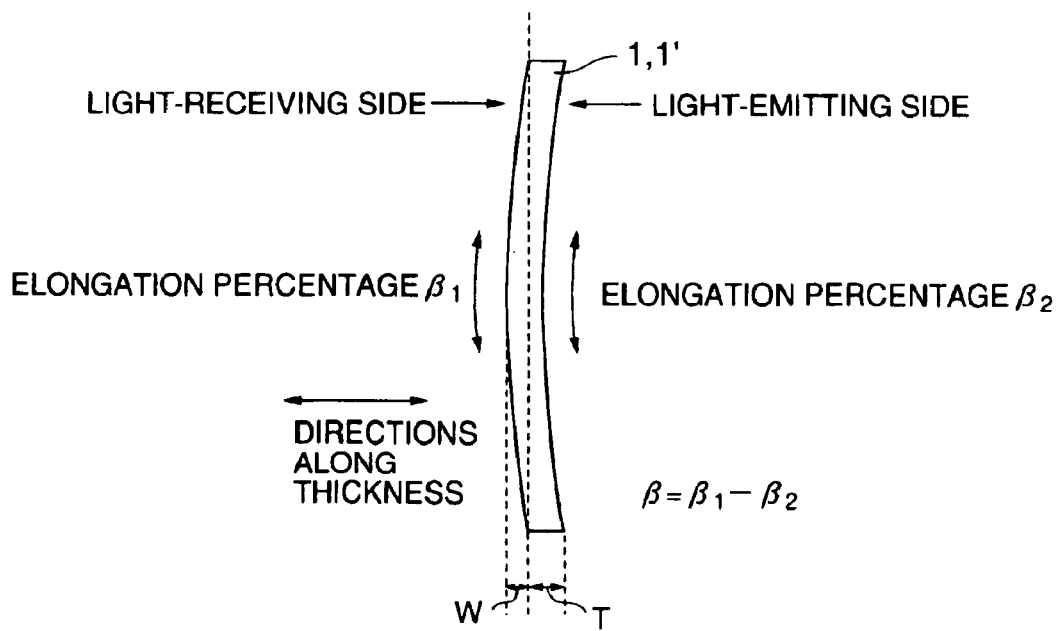
FIG. 4 is a view of assistance in explaining the warping of a Fresnel lens sheet.

The inventors of the present invention studied the deflection of a Fresnel lens sheet resulting from such a difference in elongation percentage (FIG. 4). Suppose that a Fresnel lens sheet (1 or 1') has a horizontal length L ($L_1$ or $L_2$) (mm), and a thickness T ($T_1$ or $T_2$) (mm), the difference in elongation percentage between the entrance surface and the exit surface of the Fresnel lens sheet is β (%), the deflection in the direction of the thickness of the Fresnel lens sheet (1 or 1') is W (mm), and the Fresnel lens sheet has a circular shape. Then, W=L²β/8T. This expression represents the relation between the difference in radius between circles and the circumference of a circle when the Fresnel lens sheet is completely free to warp.

Practically, the Fresnel lens sheet (1 or 1') is rectangular and is framed and hence the rigidity of the Fresnel lens sheet suppresses the deflection of the Fresnel lens sheet. The inventors of the present invention confirmed through studies that the actual deflection of a plastic Fresnel lens sheet of a thickness on the order of several millimeters is on the order of ⅕ of the calculated deflection W.

From those facts, the difference β between the respective actual elongation percentages $β_1$ and $β_2$ of the entrance surface and the exit surface is A/10, where A is the maximum elongation percentage (%) of the Fresnel lens sheet 1 (FIG. 1) or the base sheet 11 (FIG. 2) due to moisture absorption. The deflection W (mm) due to the elongation percentage difference is expressed by: W=(L²/8T)×(A/10)×(⅕)=L²A/400T, where L (mm) is the horizontal length of the Fresnel lens sheet or the base sheet, and T (mm) is the thickness of the Fresnel lens sheet or the base sheet. Since the allowable deflection W is not greater than 3L/2000 as mentioned above, L²A/400T≦3L/2000, and hence A≦0.6T/L.

Figure 2:
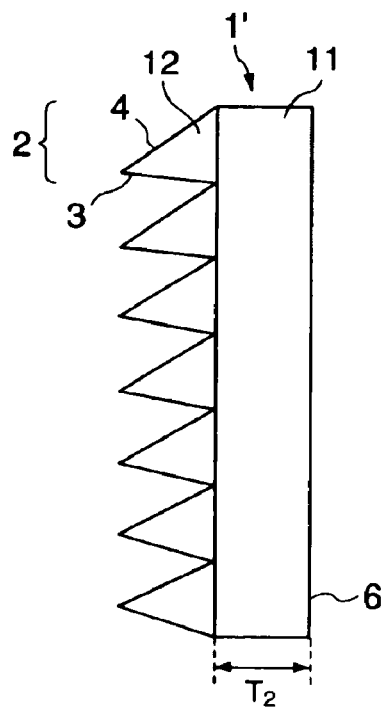
FIG. 2 is a sectional view of a composite Fresnel lens sheet having a base sheet, and Fresnel lens elements formed on the base sheet.
Figure 3:
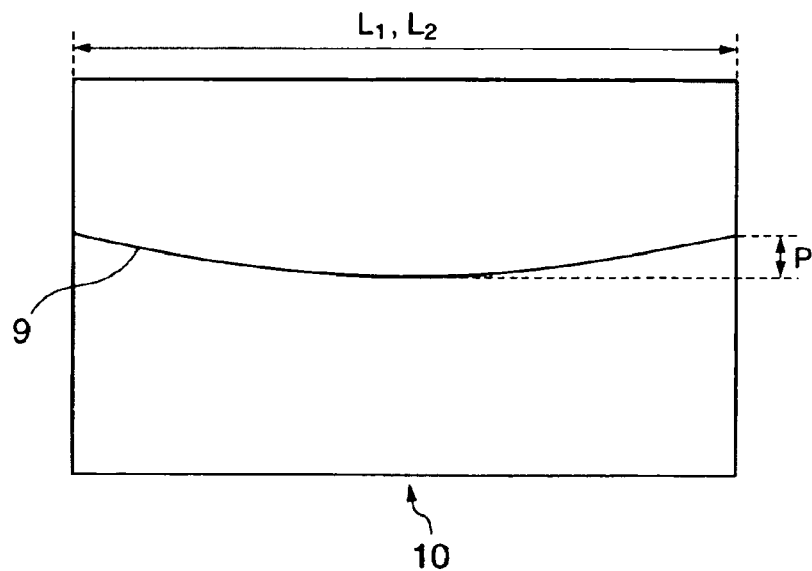
FIG. 3 is a view of assistance in explaining the distortion of an image of a horizontal straight line displayed on a screen.

The horizontal length $L_1$ of the Fresnel lens sheet 1 is the width of the Fresnel lens sheet 1, and the horizontal length $L_2$ of the base sheet 11 is the width of the base sheet 11 of the Fresnel lens sheet 1'. As shown in FIG. 1, the thickness $T_1$ of the Fresnel lens sheet 1 is the thickness of a part of the Fresnel lens sheet 1 excluding the Fresnel lens elements. As shown in FIG. 2, the thickness $T_2$ is the thickness of the base sheet 11. The symbol T in the relational expression representing the requisite condition indicates the thickness of the Fresnel lens sheet excluding the Fresnel lens elements or the thickness of the base sheet. Since the thickness of the Fresnel lens elements is 1/10 or below of the thickness of the Fresnel lens sheet excluding the Fresnel lens elements, the thickness of the Fresnel lens elements scarcely affects the elongation of the Fresnel lens sheet. The elongation percentage $A_1$ of the Fresnel lens sheet 1 due to moisture absorption is expressed by: $A_1=(L_1(b)-L_1(a))/L_1(a)$, where $L_1(a)$ is the horizontal length before moisture absorption, and $L_1(b)$ is the horizontal length after moisture absorption. The elongation percentage $A_2$ of the base sheet 11 at which the base sheet 11 lengthens due to moisture absorption is expressed by: $A_2=(L_2(b)-L_2(a))/L_2(a)$, where $L_2(a)$ is the horizontal length before moisture absorption, and $L_2(b)$ is the horizontal length after moisture absorption. The elongation percentage reaches a maximum at a maximum moisture absorption.

First Embodiment

FIG. 1 shows a unitary Fresnel lens sheet 1 provided with a total reflection Fresnel lens 2 in a first embodiment according to the present invention. The Fresnel lens sheet 1 is a unitary Fresnel lens sheet having an entrance surface 1a provided with a plurality of total reflection Fresnel lens elements 2, and an exit surface 1b. Each of the Fresnel lens elements 2 has a light-receiving facet 3, and a total reflection facet 4 that deflects some or all of image light rays 5 fallen on the light-receiving facet 3 in a desired direction. The Fresnel lens sheet 1 meets the foregoing requisite condition expressed by the relational expression.

Preferable transparent resins for forming the Fresnel lens sheet 1 include styrene resins that lengthen at a small elongation percentage due to moisture absorption, acryl-styrene copolymers, and polycarbonate resins. The Fresnel lens sheet is formed by molding the preferable resin by press molding, injection molding or casting using a mold having a molding surface of a shape complementary to that of the Fresnel lens sheet. The transparent resin may be a pure, homogeneous resin. Preferably, various stray light eliminating means are applied to the Fresnel lens sheet.

Figure 7:
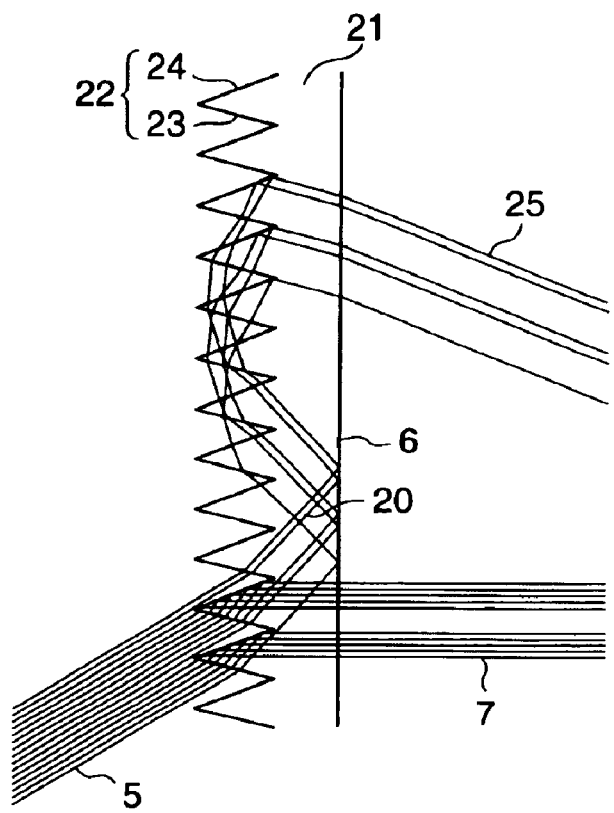
FIG. 7 is a diagrammatic view showing light paths of assistance in explaining stray light in a Fresnel lens sheet.

Stray light will be explained. Referring to FIG. 7, stray light rays 20 are those among image light rays 5 fallen on the light-receiving facet 23 of each total reflection Fresnel lens element 22 and do not fall on the total-reflection facet 24 of the Fresnel lens element 22. Stray light rays 20 appear when the incident angle θ of image light rays 5 on a Fresnel lens sheet 21 is small and, therefore, stray light rays 20 are liable to appear in a lower part of the Fresnel lens sheet 21. The stray light rays 20 that appear in the Fresnel lens sheet 21 are reflected by the exit surface 6 toward the total-reflection Fresnel lens elements 22. Thus, the stray light rays 20 are reflected repeatedly in the Fresnel lens sheet 21 and finally leaves the Fresnel lens sheet 21 as light rays 25. The light rays 25 leaves the exit surface 6 at a position different from a position where the normal image light rays 7 leaves the exit surface 6. Thus, the normal image light rays 7 and the light rays 25 form different images, i.e., a double image.

The Fresnel lens sheet of the present invention suppresses the appearance of stray light rays that form a double image by the following stray light suppressing means.

Figure 8:
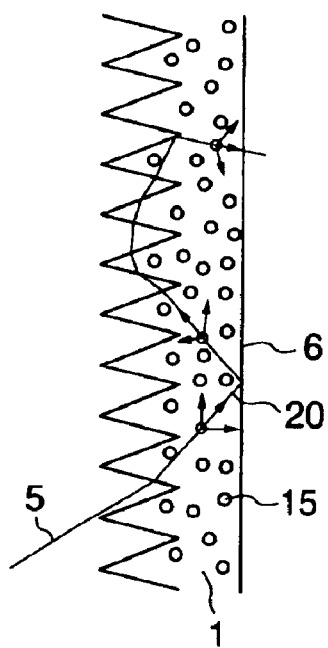
FIG. 8 is a sectional view of a Fresnel lens sheet containing light-diffusing particles.

A first stray light suppressing means is to disperse a diffusing material in a Fresnel lens sheet 1. FIG. 8 is a sectional view of a Fresnel lens sheet 1 containing a diffusing material 15 that diffuses light. The diffusing material 15 is selected taking into consideration the difference in refractive index between a resin forming the Fresnel lens sheet 1 and the diffusing material. Suitable diffusing materials are, for example, powders composed of organic particles, such as styrene resin particles, silicone resin particles, acrylic resin particles and MS resin particles, and powders composed of inorganic particles, such as barium sulfide particles, glass particles, aluminum hydroxide particles, calcium carbonate particles, silica (silicon dioxide) particles and titanium oxide particles. One or a mixture of some of those powders is mixed in a resin. The particles of various shapes, such as a spherical shape, a substantially spherical shape and an indefinite shape, may be used. Stray light rays 20 that travel long optical path lengths in this Fresnel lens sheet 1 are diffused by the diffusing material 15 while the stray light rays 20 are repeatedly refracted in the Fresnel lens sheet 1, so that conspicuous double images are not formed.

A second stray light suppressing means is to color a Fresnel lens sheet 1 with a coloring matter to absorb light. Suitable coloring matters are black dyes, pigments and carbon black. A colored Fresnel lens sheet is formed by, for example, casting or extruding a resin containing a coloring matter. Since stray light rays 20 that travel long optical path lengths while normal image light rays 7 travel short optical path lengths, the stray light rays 20 are absorbed by the colored Fresnel lens sheet at a higher rate than the normal image light rays 7, so that conspicuous double images are not formed.

Figure 9:
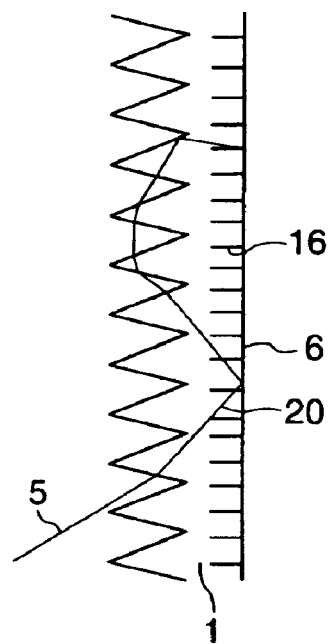
FIG. 9 is a sectional view of a Fresnel lens sheet provided with a light-absorbing layer.

A third stray light suppressing means is to form a light-absorbing layer on a Fresnel lens sheet 1. FIG. 9 is a sectional view of a Fresnel lens sheet 1 embodying the present invention provided with a light-absorbing layer (light-absorbing part) 16. The light-absorbing layer 16 is formed by filling up fine grooves of about 10 $\mu$m in thickness and about 100 $\mu$m in depth formed in the exit surface of the Fresnel lens sheet 1 with a black ink. The fine grooves are parallel to the traveling direction of light and arranged at equal intervals. Stray light rays 20 that travel long optical path lengths are absorbed by the light-absorbing layer 16, so that conspicuous double images are not formed.

Figure 10:
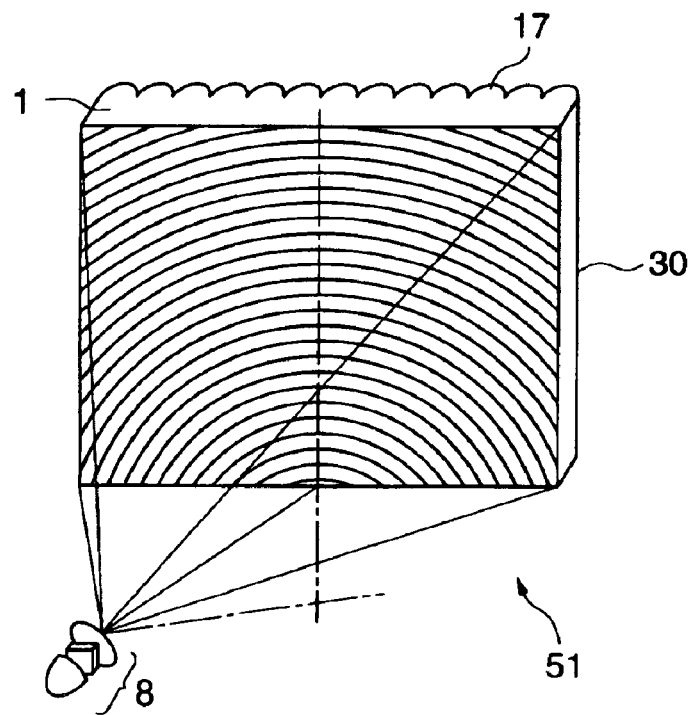
FIG. 10 is a perspective view of a Fresnel lens sheet having an exit surface provided with a vertical lenticular lens.
Figure 11:
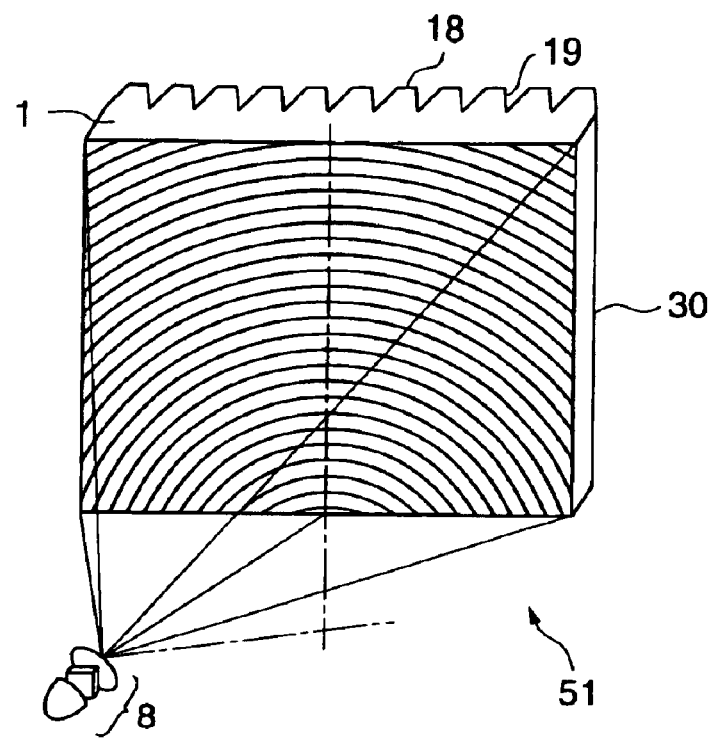
FIG. 11 is a perspective view of a Fresnel lens sheet having an exit surface provided with a vertical lenticular lens consisting of lenticular lens elements having a trapezoidal cross section.

A fourth stray light suppressing means is to form lenticular lens elements on the exit surface of a Fresnel lens sheet 1. FIG. 10 shows a Fresnel lens sheet 1 provided on its exit surface, having a lenticular lens 17 consisting of vertical lenticular lens elements having a substantially semicircular cross section. FIG. 11 shows a Fresnel lens sheet 1 provided on its exit surface with a lenticular lens 18 consisting of vertical lenticular lens elements having a trapezoidal cross section. The lenticular lens 17 consisting of the vertical lenticular lens elements having a substantially semicircular cross section diffuses light rays including stray light rays horizontally, so that conspicuous double images are not formed. The inclined facets 19 of the vertical lenticular lens elements having a trapezoidal cross section of the lenticular lens 18 reflects stray light rays in a total reflection mode, so that conspicuous double images are not formed.

A Fresnel lens sheet 1 embodying the present invention may have an entrance surface coated with a coating layer 1c or an exit surface coated with a coating layer 1d or may have an entrance surface coated with a coating layer 1c and an exit surface coated with a coating layer 1d. Preferably, the coating layers 1c and 1d are formed of a material having a low refractive index, such as a fluorocarbon resin or a silicone resin. The coating layers 1c and 1d are formed by a dipping process or a flow-coating process. Preferably, the coating layer 1d is formed on the exit surface 6 of the Fresnel lens sheet 1. It is more effective to form the coating layers 1c and 1d on the entrance surface and the exit surface 6, respectively. The coating layer 1c and 1d have an antireflection effect and prevent the reduction of contract in images due to reflected light reflected by the surfaces of the Fresnel lens sheet 1 (FIG. 1).

Figure 15:
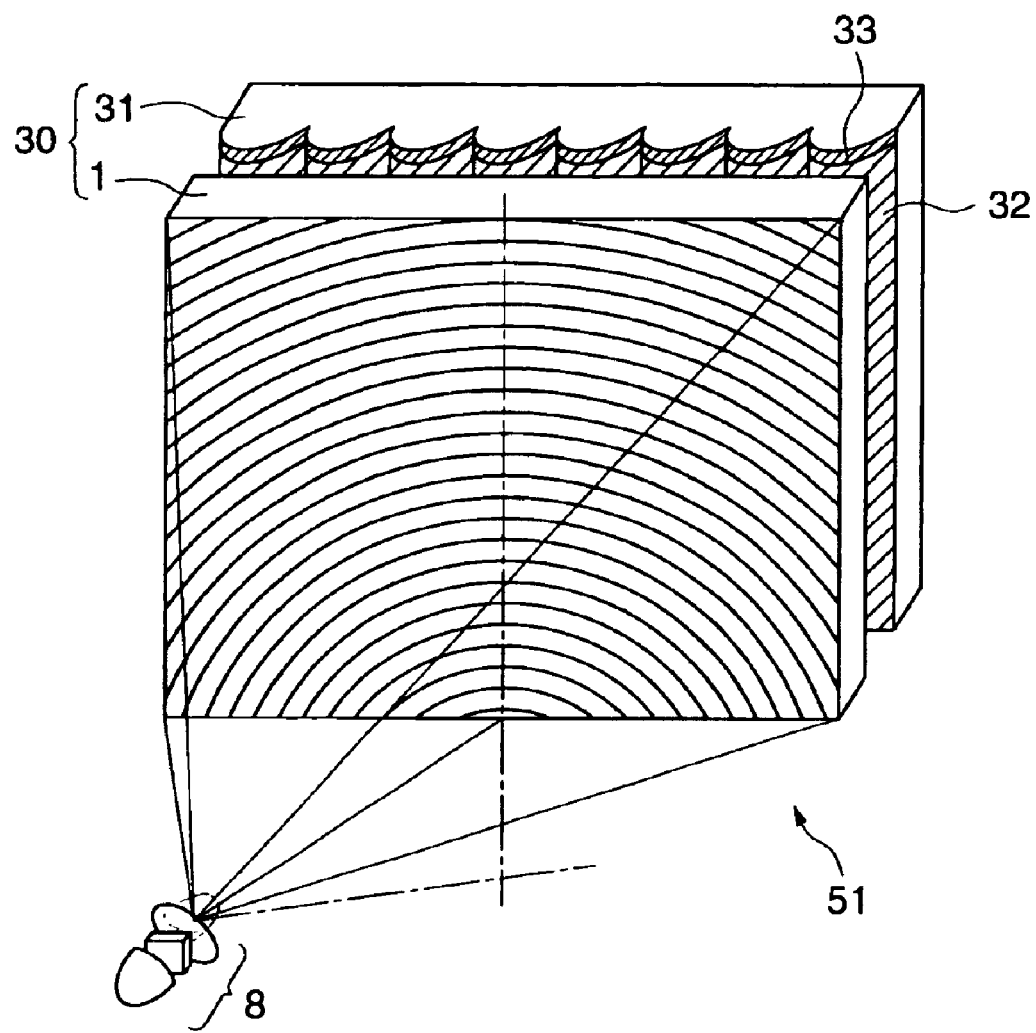
FIG. 15 is a perspective view of a rear projection screen in a preferred embodiment according to the present invention.
Figure 16:
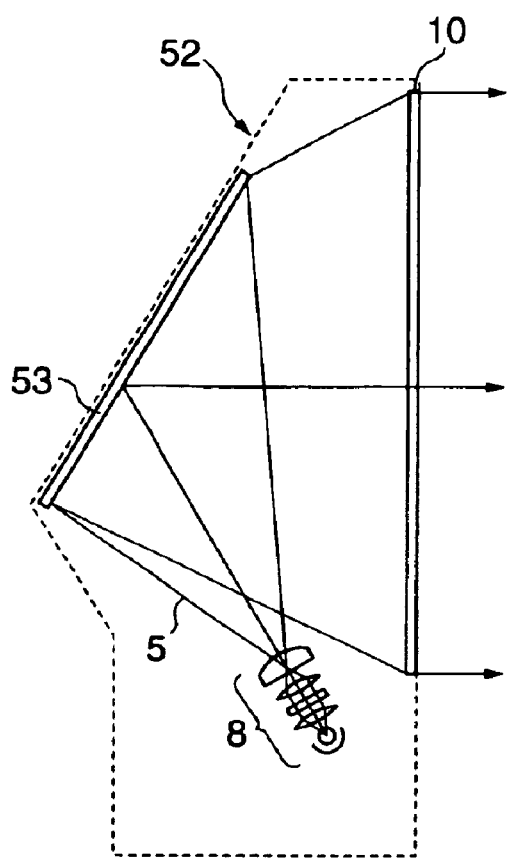
FIG. 16 is a schematic side elevation of a conventional rear projection display.
Figure 17:
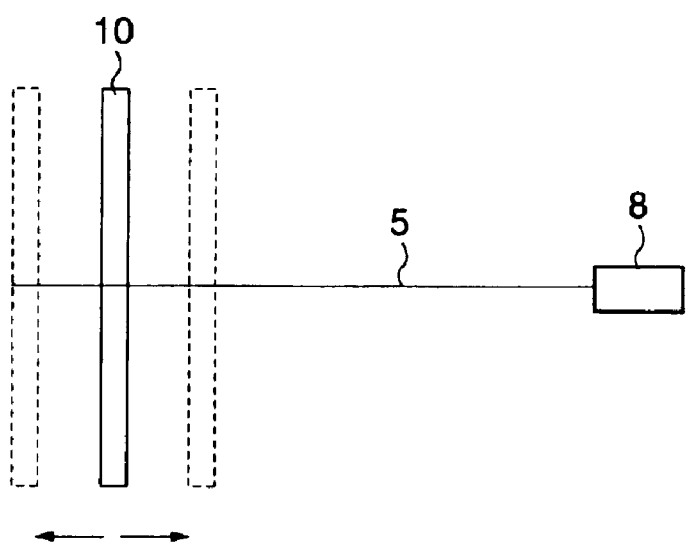
FIG. 17 is a diagrammatic view of assistance in explaining the displacement of an image due to the displacement of a Fresnel lens in the conventional rear projection display.

Coating layers similar to the coating layers 1c and 1d may be formed on the surfaces of the Fresnel lens sheets 1 respectively provided with the lenticular lenses 17 and 18, and a composite rear projection screen formed by combining a Fresnel lens sheet 1 and a lenticular lens sheet 31 (FIGS. 10, 11 and 15).

Second Embodiment

FIG. 2 is a sectional view of a composite Fresnel lens sheet 1' consisting of a base sheet 11, and a Fresnel lens 12 formed on the base sheet 11. The Fresnel lens sheet 1' is a composite Fresnel lens having an entrance surface provided with the Fresnel lens 12 consisting of a plurality of total reflection Fresnel lens elements 2, and an exit surface. Each of the Fresnel lens elements 2, similarly to that of the Fresnel lens sheet 1 in the first embodiment, has a light-receiving facet 3, and a total reflection facet 4 that deflects some or all of image light rays 5 fallen on the light-receiving facet 3 in a desired direction. The Fresnel lens sheet 1' meets the foregoing requisite condition expressed by the relational expression.

The base sheet 11 is formed of a transparent resin that lengthens at a small elongation percentage due to moisture absorption. Preferable transparent resins for forming the base sheet 11 include styrene resins, acryl-styrene copolymers, and polycarbonate resins. The Fresnel lens elements 2 are very thin as compared with the base sheet 11 and scarcely affect the elongation of the Fresnel lens sheet 1'. Preferably, the Fresnel lens elements 2 are formed of a generally used UV-curable acrylic resin.

As shown in FIG. 2, the Fresnel lens sheet 1' has the Fresnel lens 12 consisting of the fine total-reflection Fresnel lens elements 2, and the base sheet 11 having a proper rigidity. The Fresnel lens 12 of a UV-curable resin can be easily formed on the base sheet 11. Thus, the Fresnel lens sheet 1' can be manufactured at a low manufacturing cost.

Since the flexibility of the Fresnel lens sheet 1' is dominated by the flexibility of the base sheet 11, the base sheet 11 is formed so as to meet the foregoing requisite condition expressed by the relational expression. Since the thickness of the Fresnel lens elements 2 is $\frac{1}{10}$ or below of the thickness of the base sheet 11, the thickness of the Fresnel lens elements 2 scarcely affects the elongation of the Fresnel lens sheet 1'. Therefore, the base sheet 11 is formed in a thickness $T_2$ and a length $L_2$ and in a property having an elongation percentage $A_2$ meeting the relational expression representing the requisite condition.

The Fresnel lens sheet 1' in the second embodiment, similarly to the Fresnel lens sheet 1 in the first embodiment, may contain a diffusing material or its exit surface may be provided with a lenticular lens or a louver to suppress the adverse effect of stray light rays and to suppress the reduction of contrast in images.

Third Embodiment

FIG. 13A is a sectional view of a composite Fresnel lens sheet 41 including a lens sheet 13 and an auxiliary sheet 14 attached to the exit surface of the lens sheet 13. The Fresnel lens sheet 41 is a composite Fresnel lens having an entrance surface provided with the lens sheet 13 provided with a Fresnel lens 12 consisting of a plurality of total reflection Fresnel lens elements 2, and an exit surface. Each of the Fresnel lens elements 2, similarly to that of the Fresnel lens sheet 1 in the first embodiment, has a light-receiving facet 3, and a total reflection facet 4 that deflects some or all of image light rays 5 fallen on the light-receiving facet 3 in a desired direction. The Fresnel lens sheet 41 meets the foregoing requisite condition expressed by the relational expression. The Fresnel lens sheet 41 in the third embodiment is characterized by the lens sheet 13 provided with the Fresnel lens 12 consisting of the total-reflection Fresnel lens elements 2 as mentioned in the description of the first embodiment.

The lens sheet 13 of the Fresnel lens sheet 41 is thin as compared with the auxiliary sheet 14. Therefore, preferable transparent resins for forming the auxiliary sheet 14 are styrene resins that lengthen at a small elongation percentage due to moisture absorption, acryl-styrene copolymers and polycarbonate resins. Since the Fresnel lens sheet 41 meets the foregoing requisite condition, the distortion of a projected image projected on the Fresnel lens sheet 41 can be suppressed, and the deterioration of the flatness of the Fresnel lens sheet 41 can be limited to the least extent even if the Fresnel lens sheet 41 is used in an environment subject to humidity variation.

The lens sheet 13 is thin as compared with the auxiliary sheet 14 and affects the elongation of the Fresnel lens sheet 41 scarcely as mentioned in the description of the second embodiment. Therefore, the lens sheet 13 is formed of a generally used UV-curable acrylic resin. The lens sheet 13 may be formed, similarly to or identically to the auxiliary sheet 14, of a resin that lengthens at a small elongation percentage due to moisture absorption.

Figure 12:
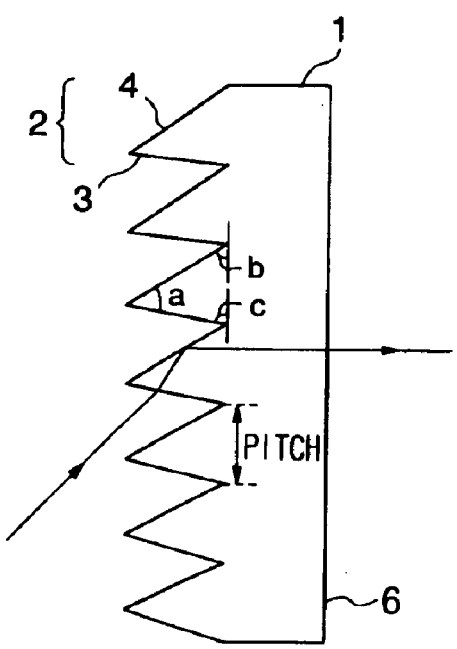
FIG. 12 is a sectional view of a total-reflection Fresnel lens sheet in a preferred embodiment according to the present invention.

Referring to FIG. 14, the lens sheet 13 is formed by molding the preferable resin by press molding, injection molding or casting on a mold 42 having molding surface of a shape complementary to that of the lens sheet 13, and is removed from the mold 42. The lens sheet 13 is provided with the Fresnel lens 12 consisting of the total-reflection Fresnel lens elements 2. The total-reflection Fresnel lens elements 2 have each a light-receiving facet 3 and a reflecting surface 4 and a triangular cross section having angles a, b and c, and are arranged at fixed pitches as shown in FIG. 12.

The transparent resin may be a pure, homogeneous resin. Preferably, any of the foregoing stray light eliminating means is applied to the Fresnel lens sheet to suppress the appearance of stray light rays.

The lens sheet 13 and the auxiliary sheet 14 may be bonded together with a transparent epoxy adhesive or a transparent acrylic adhesive. The lens sheet 13 and the auxiliary sheet 14 may be bonded together by forming a layer of a UV-curable resin between the lens sheet 13 and the auxiliary sheet 14, and exposing the laminated structure of the lens sheet 13 and the auxiliary sheet 14 to UV radiation. Preferably, the thickness of the bonding layer of the adhesive or the like is in the range of about 10 to about 100 µm.

A lenticular lens may be formed on the auxiliary sheet 14 to form a lenticular lens sheet. A Fresnel lens sheet provided with a lenticular lens can be very efficiently fabricated by bonding a lenticular lens sheet to the Fresnel lens.

The thickness of the Fresnel lens sheet must meet the foregoing requisite condition expressed by the relational expression. Preferably, the thickness of the Fresnel lens sheet is in the range of 2 to 6 mm. When the angle a of the Fresnel lens elements 2 is in an acute angle of about 40°, such as in the range of 36° to 44°, the thickness of the lens sheet 13 is in the range of 0.5 to 2 mm, more preferably, in the rang of 1 to 2 mm, to facilitate removing the lens sheet 13 from the mold. Preferably, the thickness of the auxiliary sheet 14 is in the range of 2 to 4 mm.

The Fresnel lens sheet 41 in the third embodiment, similarly to the Fresnel lens sheet 1 in the first embodiment, may contain a diffusing material or a lenticular lens or its exit surface may be provided with a lenticular lens or a louver to suppress the adverse effect of stray light rays and to suppress the reduction of contrast in images.

The lens sheet 13 of the Fresnel lens sheet in the third embodiment can be formed in a very small thickness, and hence the thin, flexible lens sheet 13 can be easily removed from the mold 42 having a molding surface of a shape complementary to that of the lens sheet 13. Accordingly, the Fresnel lens sheet can be efficiently manufactured. The Fresnel lens sheet meeting the foregoing requisite condition expressed by the relational expression does not cause significant distortion of an image projected thereon even in an environment subject to humidity variation, and the Fresnel lens improves the efficiency of molding removing work.

Fourth Embodiment

FIG. 13B is a sectional view of a composite Fresnel lens sheet 41' having a lens sheet 13' provided with a Fresnel lens 12 consisting of a plurality of total-reflection Fresnel lens elements 2, and an auxiliary sheet 14 attached to the exit surface of the lens sheet 13'. Each of the Fresnel lens elements 2, similarly to that of the Fresnel lens sheet 1 in the first embodiment, has a light-receiving facet 3, and a total reflection facet 4 that deflects some or all of image light rays 5 fallen on the light-receiving facet 3 in a desired direction. The Fresnel lens sheet 41' meets the foregoing requisite condition expressed by the relational expression.

The Fresnel lens sheet 41' in the fourth embodiment is characterized by the lens sheet 13' having a base sheet 11 having a rigidity to provide the Fresnel lens sheet 41' with a proper stiffness, and the Fresnel lens 12 consisting of the total-reflection Fresnel lens elements 2 as shown in FIG. 13B.

In the Fresnel lens sheet 41', the lens sheet 13' is thin as compared with the auxiliary sheet 14, and the Fresnel lens 12 is very thin as compared with the base sheet 11. Therefore, preferable transparent resins for forming the auxiliary sheet 14 are styrene resins that lengthen at a small elongation percentage due to moisture absorption, acrylstyrene copolymers and polycarbonate resins. Since the Fresnel lens sheet 41' meets the foregoing requisite condition, the distortion of a projected image projected on the Fresnel lens sheet 41' can be suppressed, and the deterioration of the flatness of the Fresnel lens sheet 41' can be limited to the least extent even if the Fresnel lens sheet 41' is used in an environment subject to humidity variation.

Since the lens sheet 13' is thin as compared with the auxiliary sheet 14, the lens sheet 13' does not affect greatly elongation percentage at which the Fresnel lens sheet 41' lengthens due to moisture absorption as mentioned in the description of the second embodiment. Therefore, the lens sheet 13' is formed of a generally used UV-curable acrylic resin. The lens sheet 13' may be formed, similarly to the auxiliary sheet 14, of a resin that lengthens at a small elongation percentage due to moisture absorption. The Fresnel lens 12 of a UV-curable resin can be easily formed on the base sheet 11. Thus, the Fresnel lens sheet 41' can be manufactured at a low manufacturing cost. The base sheet 11 of the lens sheet 13' may be formed, similarly to the auxiliary sheet 14, of a resin that lengthens at a small elongation percentage due to moisture absorption, and the Fresnel lens 12 may be formed of a UV-curable resin.

The lens sheet 13' is formed by forming the Fresnel lens 12 of a transparent resin on a mold 42 having a molding surface of a shape complementary to that of the Fresnel lens 12 by press molding, injection molding or casting. The lens sheet 13' may be formed of a pure, homogeneous resin. Preferably, any of the foregoing stray light eliminating means can be applied to the Fresnel lens sheet to suppress the appearance of stray light rays.

The lens sheet 13' and the auxiliary sheet 14 may be bonded together by a bonding method similar to that previously described in connection with the third embodiment. The auxiliary sheet 14 may be a lenticular lens sheet provided with a lenticular lens as mentioned in the description of the third embodiment. Conditions for the respective thicknesses of the Fresnel lens sheet 41', the lens sheet 13' and the auxiliary sheet 14 are similar to those mentioned in the description of the third embodiment.

The flexibility of the Fresnel lens sheet 41' is dependent on the properties of the base sheet 11 of the lens sheet 13', and the auxiliary sheet 14. Therefore, only the characteristic of the Fresnel lens sheet 41' having the base sheet 11 and the auxiliary sheet 14 needs to meet the foregoing requisite condition featuring the present invention. Since the thickness of the Fresnel lens 12 is $\frac{1}{10}$ or below of the thickness of the Fresnel lens sheet 41', the thickness of the Fresnel lens 12 scarcely affects the elongation of the Fresnel lens sheet 41'. Therefore, a structure consisting of the base sheet 11 of the lens sheet 13', and the auxiliary sheet 14 is formed in a thickness $T_2$ and a length $L_2$ and in a property having an elongation percentage $A_2$ meeting the relational expression representing the requisite condition.

The Fresnel lens sheet 41' in the fourth embodiment, similarly to the Fresnel lens sheet 1 in the first embodiment, may contain a diffusing material or its exit surface may be provided with a lenticular lens or a louver to suppress the adverse effect of stray light rays and to suppress the reduction of contrast in images.

The lens sheet 13' of the Fresnel lens sheet 41' in the fourth embodiment can be formed in a further reduced thickness, and hence the thin, flexible lens sheet 13' can be easily removed from the mold 42 having a molding surface of a shape complementary to that of the Fresnel lens 12 formed on the lens sheet 12 and hence the Fresnel lens sheet 41' can be efficiently manufactured. Since the Fresnel lens sheet meets the requisite condition expressed by the relational expression, images projected on the Fresnel lens sheet are scarcely distorted, and the lens sheet can be efficiently removed from the mold.

Rear Projection Screen and Rear projection Display

A rear projection screen 30 included in a rear projection display 51 embodying the present invention may be only any one of the Fresnel lens sheets 1, 1', 41 and 41', or may be a combination of the Fresnel lens sheet 1 and a lenticular lens sheet 31 as shown in FIG. 15. The lenticular lens sheet 31 is provided with a lenticular lens 32 provided with a light-absorbing layer 33. A front sheet or the like may be added to the combination of the Fresnel lens sheet 1 and the lenticular lens sheet 31. The rear projection screen 30 comprises a Fresnel lens sheet meeting the requisite condition expressed by the foregoing relational expression.

Figure 5:
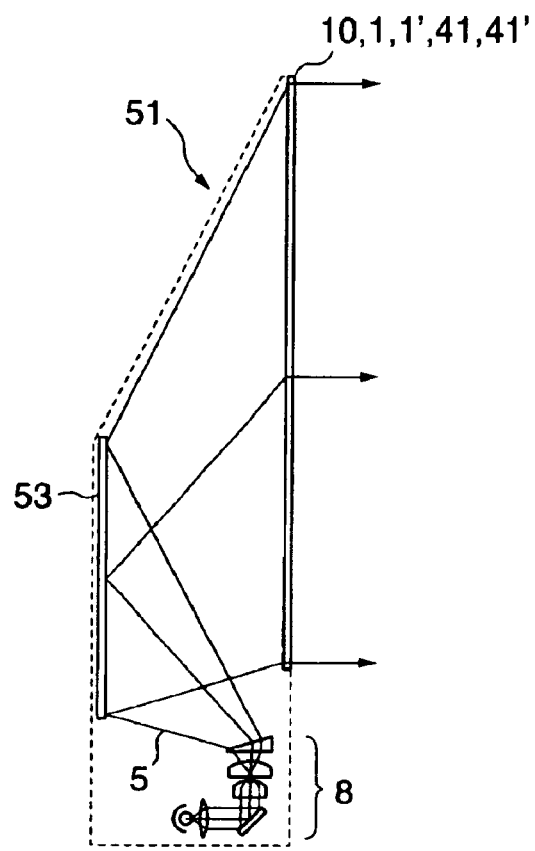
FIG. 5 is schematic side elevation of a thin rear projection display in a preferred embodiment according to the present invention employing a single-tube light source.

Referring to FIG. 5, a rear projection display 51 embodying the present invention includes any one of the Fresnel lens sheets 1, 1', 41 and 41' or the rear projection screen 30, a mirror 53, and a light source 8 that projects an image.

Any conventional structures may be incorporated into the Fresnel lens sheet of the present invention, provided that the Fresnel lens sheet meets the requisite condition featuring the present invention and is able to achieve the object of the present invention.

If the Fresnel lens sheet lengthens due to moisture absorption as shown in FIG. 6, the Fresnel lens sheet will warp, and will move toward or away from the light source by a distance Q. The Fresnel lenses 1 and 1' of the present invention do not warp and prevents the distortion of the image.

EXAMPLES

Examples of the rear projection screen of the present invention will be explained.

Example 1

A rear projection display 51 had a 50 in. rear projection screen 30 (aspect ratio: 4:3, 762 mm by 1062 mm) provided with the Fresnel lens sheet 1 (1', 41 or 41'), and an image projector (light source) 8 for projecting an image on the rear projection screen 30 from behind the screen 30. The horizontal distance between the Fresnel lens sheet 1 and the image projector 8 was 320 mm. The vertical distance between the lower end of the rear projection screen 30 and a horizontal plane including the image projector 8 was 220 mm. The incident angle of an image light ray that falls on the center of the rear projection screen 30 was 62°.

The Fresnel lens sheet 1 was formed of an acryl-styrene copolymer, had a thickness T of 6 mm, and was provided with Fresnel lens elements arranged at pitches of 0.11 mm. The refractive index of the Fresnel lens sheet 1 was 1.57. The maximum elongation percentage due to moisture absorption of the Fresnel lens sheet 1 was 0.3%.

Calculation of the relational expression: $A \leq 0.6T/L$ was carried out using those values of the parameters of the relational expression. The value of the left side of the relational expression was A=0.003, and that of the right side of the relational expression was 0.6×6/1016=0.00354.

The rear projection screen 30 in Example 1 was formed by disposing a Fresnel lens sheet 1, and a 1 mm thick lenticular lens sheet 31 (peak gain=4, $\alpha H=25°$, $\alpha V=8°$) provided with vertical lenticular lens elements 32 arranged at pitches of 0.14 mm, containing a light-diffusing material, and provided with light-absorbing layers 33 on the end surfaces of the lenticular lens elements 32 on the side of the exit surface of the Fresnel lens sheet 1 as shown in FIG. 15. The gain G of the lenticular lens sheet 31 is calculated by using: $G=\pi \times$ (luminance $(cd/m^2)$)/(illuminance (1x)) on the basis of measured angular distribution of luminance on the front surface of the rear projection screen that receives image light on its back surface, and illuminance and luminance on the rear projection screen. The peak gain is the maximum gain of the rear projection screen. In this specification, the peak gain is the maximum gain at the center of the rear projection screen when the rear projection screen is observed from the front side. The symbol $\alpha H$ indicates the half angle of the peak gain with respect to the horizontal direction, and the symbol $\alpha V$ indicates the half angle of the peak gain with respect to the vertical direction.

The rear projection screen 30 did not distort images and displayed images satisfactorily regardless of changes in the environment.

Example 2

A rear projection display 51 had a 60 in. rear projection screen (aspect ratio: 4:3, 914 mm by 1219 mm) 30 provided with a Fresnel lens sheet 1, and an image projector (light source) projecting light obliquely on the screen from behind the rear projection screen 30. The horizontal distance between the Fresnel lens sheet 1 and the image projector 8 was 350 mm. The vertical distance between the lower end of the rear projection screen 30 and a horizontal plane including the image projector was 293 mm. The incident angle of an image light ray that falls on the center of the rear projection screen 30 was 65°.

The Fresnel lens sheet 1 was formed of a polycarbonate resin, had a thickness T of 3 mm, and was provided with Fresnel lens elements arranged at pitches of 0.11 mm. The refractive index of the Fresnel lens sheet was 1.59. The maximum elongation percentage resulting from moisture absorption of the Fresnel lens sheet 1 was 0.1%.

Calculation of the relational expression: $A \leq 0.6T/L$ was carried out using those values of the parameters of the relational expression. The value of the left side of the relational expression was A=0.001, and that of the right side of the relational expression was 0.6×3/1219=0.00148.

The rear projection screen 30 in Example 2 was formed by disposing a Fresnel lens sheet 1, and a 1 mm thick lenticular lens sheet 31 (peak gain=4, $\alpha H=25°$, $\alpha V=8°$) provided with vertical lenticular lens elements 32 arranged at pitches of 0.14 mm, containing a light-diffusing material, and provided with light-absorbing layers 33 on the end surfaces of the lenticular lens elements 32 on the side of the exit surface of the Fresnel lens sheet 1.

The rear projection screen 30 did not distort images, but displayed images satisfactorily regardless of changes in the environment.

Example 3

A rear projection display including a rear projection screen in Example 3 had an image projection system and a Fresnel lens sheet 1, which were the same as those of the rear projection display in Example 1. A lenticular lens was formed on the exit surface of the Fresnel lens sheet 1. The lenticular lens was provided with vertical lenticular lens elements arranged at pitches of 0.14 mm and provided with total-reflection surfaces. The lenticular lens contained a diffusing material such that the half angle $\alpha V$ in a diffusion characteristic graph was 10°. The lenticular lens contained a light-absorbing material such that the transmittance of the lenticular lens was 50%. The rear projection screen had an optical characteristic represented by a peak gain of 2, an $\alpha H$ of 40° and an $\alpha V$ of 10°.

The rear projection of unitary construction facilitated handling was affected scarcely by changes in the environment and could display images satisfactorily.

Example 4

A rear projection display including a rear projection screen in Example 4 had an image projection system and a Fresnel lens sheet 1, which were the same as those of the rear projection display in Example 2. A Fresnel lens consisting of Fresnel lens elements arranged at pitches of 0.11 mm was formed of a UV-curable resin (refractive index: 1.59) on the 3 mm thick polycarbonate base sheet. The thickness of the layer of the UV-curable resin was 0.2 mm. The base sheet had a maximum elongation percentage of 0.1% resulting from moisture absorption.

Calculation of the relational expression: $A \leq 0.6T/L$ was carried out using those values of the parameters of the relational expression. The value of the left side of the relational expression was A=0.001, and that of the right side of the relational expression was 0.6×3/1219=0.00148.

The rear projection screen in Example 4 was formed, similarly to the rear projection screen in Example 2, by disposing a 1 mm thick lenticular lens sheet 31 (peak gain=4, $\alpha H=25°$, $\alpha V=8°$) provided with vertical lenticular lens elements 32 arranged at pitches of 0.14 mm, containing a light-diffusing material, and provided with light-absorbing layers 33 on the end surfaces of the lenticular lens elements 32 on the side of the exit surface of the Fresnel lens sheet 1.

The rear projection screen 30 did not distort images and displayed images satisfactorily regardless of changes in the environment.

Example 5

A rear projection display including a rear projection screen in Example 5 had an image projection system and a Fresnel lens sheet, which were the same as those of the rear projection display in Example 1. The thickness of the Fresnel lens sheet was 6 mm. The Fresnel lens sheet was similar to the Fresnel lens sheet 41 shown in FIG. 13A. The Fresnel lens sheet was formed by bonding together a 2 mm thick lens sheet 13 of an acryl-styrene copolymer and a 4 mm thick auxiliary sheet 14 of the same material as the lens sheet 13 with a transparent epoxy adhesive.

The lens sheet 13 of the Fresnel lens sheet could be easily removed from a mold 42 as shown in FIG. 14 and facilitated molding work. Since the lens sheet 13 and the auxiliary sheet 14 were formed of the same material, the rear projection screen was affected scarcely by changes in the environment, and the flatness of the rear projection screen was not deteriorated.

The Fresnel lens sheet of the rear projection screen in Example 5 was the same as that of the rear projection screen in Example 1 in other respects. The maximum elongation percentage resulting from moisture absorption was 0.3%. Calculation of the relational expression: $A \leq 0.6T/L$ was carried out using those values of the parameters of the relational expression. The value of the left side of the relational expression was A=0.003, and that of the right side of the relational expression was 0.6×6/1016=0.00354.

The rear projection screen in Example 5 was formed, similarly to the rear projection screen in Example 1, by disposing the same lenticular lens sheet as that of Example 1 on the side of the exit surface of the Fresnel lens sheet. The rear projection screen did not distort images and displayed images satisfactorily regardless of changes in the environment.

Example 6

A rear projection display including a rear projection screen in Example 6 had the same image projection system as that of the rear projection display including the rear projection screen in Example 2. The rear projection screen in Example 6 included a 3 mm thick Fresnel lens sheet similar to that included in Example 2. The Fresnel lens sheet, similar to the Fresnel lens sheet 41 shown in FIG. 13A, was formed by bonding together a 1 mm thick lens sheet 13 of a polycarbonate resin and a 2 mm thick auxiliary sheet 14 of the same polycarbonate resin with a transparent acrylic adhesive.

The lens sheet 13 could be very easily removed from a mold 42 and facilitated molding work. Since the lens sheet 13 and the auxiliary sheet 14 were formed of the same material, the rear projection screen was affected scarcely by changes in the environment, and the flatness of the rear projection screen was not deteriorated.

The Fresnel lens sheet of the rear projection screen in Example 6 was the same as that of the rear projection screen in Example 2 in other respects. The Fresnel lens sheet had a refractive index of 1.59 and a maximum elongation percentage resulting from moisture absorption of 0.1%. Calculation of the relational expression: $A \leq 0.6T/L$ was carried out using those values of the parameters of the relational expression. The value of the left side of the relational expression was A=0.001, and that of the right side of the relational expression was 0.6×3/1219=0.00148. The rear projection screen in Example 6 was formed, similarly to the rear projection screen in Example 2, by disposing the same lenticular lens sheet as that of Example 2 on the side of the exit surface of the Fresnel lens sheet. The rear projection screen did not distort images and displayed images satisfactorily regardless of changes in the environment.

Example 7

A rear projection display including a rear projection screen 30 in Example 7 had the same image projection system as that of the rear projection display including the rear projection screen in Example 5. The rear projection screen 30 in Example 7 included a Fresnel lens sheet similar to the Fresnel lens sheet 1 shown in FIG. 10. The Fresnel lens sheet was formed by bonding a 4 mm thick lenticular lens sheet instead of the auxiliary sheet 14 employed in Example 5 to a 2 mm thick lens sheet 13 with a transparent epoxy adhesive. The lens sheet 13 and the lenticular lens sheet were formed of the same acryl-styrene copolymer. The lenticular lens sheet was provided with a lenticular lens consisting of vertical lenticular lens elements arranged at pitches of 0.14 mm and provided with total-reflection surfaces. The lenticular lens contained a diffusing material such that the half angle $\alpha V$ in a diffusion characteristic graph was 10°. The lenticular lens contained a light-absorbing material such that the transmittance of the lenticular lens was 50%.

The rear projection screen had an optical characteristic represented by a peak gain of 2, an $\alpha H$ of 40° and an $\alpha V$ of 10°. The unitary rear projection screen 30 facilitated handling, was affected scarcely by changes in the environment and could display images satisfactorily. The rear projection screen was the same as that in Example 5 in other respects, had a refractive index of 1.57 and a maximum elongation percentage of 0.3% resulting from moisture absorption. Calculation of the relational expression : $A \leq 0.6T/L$ was carried out using those values of the parameters of the relational expression. The value of the left side of the relational expression was A=0.003, and that of the right side of the relational expression was 0.6×6/1016= 0.00354.

Example 8

A rear projection display including a rear projection screen 30 in Example 8 had the same image projection system as that of the rear projection display including the rear projection screen in Example 6. The rear projection screen in Example 8 had the same lens sheet as that of Example 6. The lens sheet 13' of the rear projection screen was formed by forming a 0.2 mm thick Fresnel lens 2 consisting of Fresnel lens elements of a UV-curable resin having a refractive index of 1.59 arranged at pitches of 0.11 mm on a 1 mm thick polycarbonate base sheet 11. A 2 mm thick lenticular lens sheet was bonded to the exit surface of the lens sheet 13' with a transparent epoxy adhesive to complete the rear projection screen 30 similar to that shown in FIG. 10. This rear projection sheet 30 was provided with the lenticular lens sheet instead of the auxiliary sheet 14 employed in Example 5. The lens sheet 13' and the lenticular lens sheet were formed of the same polycarbonate resin. The lens sheet 13' had a maximum elongation of 0.1% resulting from moisture absorption. Calculation of the relational expression: $A \leq 0.6T/L$ was carried out using those values of the parameters of the relational expression. The value of the left side of the relational expression was A=0.001, and that of the right side of the relational expression was 0.6×3/ 1219=0.00148.

The lens sheet 13' could be very easily removed from a mold 42 as shown in FIG. 14 and facilitated molding work. Since the lens sheet 13' and the lenticular lens sheet are formed of the same material, the rear projection screen is affected scarcely by changes in the environment, and the flatness of the rear projection screen was not deteriorated.

The lenticular lens sheet (peak gain=4, αH=25°, αV=8°), similarly to that employed in Example 6, had a thickness of 1 mm, provided with vertical lenticular lens elements arranged at pitches of 0.14 mm, contained a light-diffusing material, and had light-absorbing layers.

The rear projection screen did not distort images and displayed images satisfactorily regardless of changes in the environment.

As apparent from the foregoing description, the Fresnel lens sheet according to the present invention is caused scarcely to distort images projected thereon even in an environment subject to humidity variation. The thickness of the Fresnel lens sheet can be designed according to the material forming the Fresnel lens sheet, and a material for forming the Fresnel lens sheet can be selectively determined on the basis of the thickness of the Fresnel lens sheet so that the foregoing requisite condition expressed by the relational expression may be satisfied. Consequently, marked reduction of design cost and manufacturing cost can be expected.

The Fresnel lens sheet of the present invention can be formed by bonding together the thin lens sheet and the auxiliary sheet, and the thin, flexible lens sheet can be easily removed from the mold having the molding surface of a shape complementary to that of the Fresnel lens. Consequently, Fresnel lens sheet manufacturing efficiency can be improved.

What is claimed is:

1. A Fresnel lens sheet having an entrance surface and an exit surface, the entrance surface being provided with a plurality of total reflection Fresnel lens elements;

wherein each of the total reflection Fresnel lens elements has a light-receiving facet on which image light falls, and a total-reflection facet that totally reflects the image light fallen on the light-receiving facet toward the exit surface, and horizontal length $L_1$ (mm) of the Fresnel lens sheet, thickness $T_1$ (mm) of the Fresnel lens sheet and maximum elongation percentage $A_1$ (%) of the Fresnel lens sheet at which the Fresnel lens sheet lengthens due to moisture absorption of the Fresnel lens sheet, meet a requisite condition expressed by a relational expression: $A_1 \leq 0.6T_1/L_1$.

2. The Fresnel lens sheet according to claim 1, wherein the Fresnel lens sheet has a Fresnel lens element sheet provided with the total reflection Fresnel lens elements, and an auxiliary sheet attached to an exit side of the Fresnel lens element sheet.

3. The Fresnel lens sheet according to claim 2, wherein the auxiliary sheet is a lenticular lens sheet provided with a lenticular lens.

4. The Fresnel lens sheet according to claim 2, wherein the Fresnel lens element sheet and the auxiliary sheet are formed of the same material.

5. The Fresnel lens sheet according to claim 1, wherein further comprises a light-diffusing material that diffuses light.

6. The Fresnel lens sheet according to claim 1, wherein the Fresnel lens sheet is colored to absorb light.

7. The Fresnel lens sheet according to claim 1, further comprising a light-absorbing part.

8. The Fresnel lens sheet according to claim 1 further comprising antireflection layers coating both the entrance surface and the exit surface of the Freanel lens sheet, or an antireflection layer coating either the entrance surface or the exit surface of the Fresnel lens sheet.

9. A Fresnel lens sheet comprising:

a Fresnel lens having an entrance surface provided with a plurality of total reflection Fresnel lens elements; and a base sheet having an exit surface;

wherein each of the total reflection Fresnel lens elements has a light-receiving facet on which image light falls, and a total-reflection facet that totally reflects the image light fallen on the light-receiving facet toward the exit surface, and horizontal length $L_2$ (mm) of the base sheet, thickness $T_2$ (mm) of the base sheet and maximum elongation percentage $A_2$ (%) of the base sheet at which the base sheet lengthens due to moisture absorption of the base sheet, meet a requisite condition expressed by a relational expression: $A_2 \leq 0.6T_2/L_2$.

10. A rear projection screen comprising:

a Fresnel lens sheet having an entrance surface and an exit surface, the entrance surface being provided with a plurality of total reflection Fresnel lens elements; and a lenticular lens formed on the exit surface of the Fresnel lens sheet;

wherein each of the total reflection Fresnel lens elements has a light-receiving facet on which image light falls, and a total-reflection facet that totally reflects the image light fallen on the light-receiving facet toward the exit surface, and horizontal length $L_1$ (mm) of the Fresnel lens sheet, thickness $T_1$ (mm) of the Fresnel lens sheet and maximum elongation percentage $A_1$ (%) of the Fresnel lens sheet at which the Fresnel lens sheet lengthens due to moisture absorption of the Fresnel lens sheet, meet a requisite condition expressed by a relational expression: $A_1 \leq 0.6T_1/L_1$.

11. The rear projection screen according to claim 10 further comprising antireflection layers coating both the entrance surface and the exit surface of the Fresnel lens sheet or an antireflection layer coating either the entrance surface or the exit surface of the Fresnel lens sheet.

12. A rear projection screen comprising:

a Fresnel lens sheet comprising a Fresnel lens having an entrance surface provided with a plurality of total reflection Fresnel lens elements, and a base sheet having an exit surface; and a lenticular lens formed on the exit surface of the Fresnel lens sheet;

wherein each of the total reflection Fresnel lens elements has a light-receiving facet on which image light falls, and a total-reflection facet that totally reflects the image light fallen on the light-receiving facet toward the exit surface, and horizontal length $L_2$ (mm) of the base sheet, thickness $T_2$ (mm) of the base sheet and maximum elongation percentage $A_2$ (%) of the base sheet at which the base sheet lengthens due to moisture absorption of the base sheet meet a requisite condition expressed by a relational expression: $A_2 \leq 0.6T_2/L_2$.

13. A rear projection display comprising a Fresnel lens sheet having an entrance surface and an exit surface, the entrance surface being provided with a plurality of total reflection Fresnel lens elements;

wherein each of the total reflection Fresnel lens elements has a light-receiving facet on which image light falls, and a total-reflection facet that totally reflects the image light fallen on the light-receiving facet toward the exit surface, and horizontal length $L_1$ (mm) of the Fresnel lens sheet, thickness $T_1$ (mm) of the Fresnel lens sheet and maximum elongation percentage $A_1$ (%) of the Fresnel lens sheet at which the Fresnel lens sheet lengthens due to moisture absorption of the Fresnel lens sheet, meet a requisite condition expressed by a relational expression: $A_1 0.6T_1/L_1$.

14. A rear projection display comprising a Fresnel lens sheet comprising a Fresnel lens having an entrance surface provided with a plurality of total reflection Fresnel lens elements, and a base sheet having an exit surface;

wherein each of the total reflection Fresnel lens element has a light-receiving facet on which image light falls, and a total-reflection facet that totally reflects the image light fallen on the light-receiving facet toward the exit surface, and the horizontal length $L_2$ (mm) of the base sheet, thickness $T_2$ (mm) of the base sheet and maximum elongation percentage $A_2$ (%) of the base sheet at which the base sheet lengthens due to moisture absorption of the base sheet meet a requisite condition expressed by a relational expression: $A_2 \leq 0.6 T_2/L_2$.

15. A rear projection display comprising a rear projection screen comprising a Fresnel lens sheet having an entrance surface and an exit surface, the entrance surface being provided with a plurality of total reflection Fresnel lens elements; and a lenticular lens formed on the exit surface of the Fresnel lens sheet;

wherein each of the total reflection Fresnel lens elements has a light-receiving facet on which image light falls, and a total-reflection facet that totally reflects the image light fallen on the light-receiving facet toward the exit surface, and horizontal length $L_1$ (mm) of the Fresnel lens sheet, thickness $T_1$ (mm) of the Fresnel lens sheet and maximum elongation percentage $A_1$ of the Fresnel lens sheet (%) at which the Fresnel lens sheet lengthens due to moisture absorption of the Fresnel lens sheet, meet a requisite condition expressed by a relational expression: $A_1 \leq 0.6 T_1/L_1$.

16. A rear projection display comprising a rear projection screen comprising a Fresnel lens sheet having an entrance surface provided with a plurality of total reflection Fresnel lens elements; and a base sheet having an exit surface, and a lenticular lens formed on the exit surface of the Fresnel lens;

wherein each of the total reflection Fresnel lens elements has a light-receiving facet on which image light falls, and a total-reflection facet that totally reflects the image light fallen on the light-receiving facet toward the exit surface, and the horizontal length $L_2$ (mm) of the base sheet, thickness $T_2$ (mm) of the base sheet and maximum elongation percentage $A_2$ (%) of the base sheet at which the base sheet lengthens due to moisture absorption of the base sheet, meet a requisite condition expressed by a relational expression: $A_2 \leq 0.6 T_2/L_2$.

* * * * *